United States Patent [19]

Dargis et al.

[11] Patent Number: 5,289,287
[45] Date of Patent: Feb. 22, 1994

[54] DOCKABLE LCD TV PROJECTOR CONVERTABLE BETWEEN FRONT AND REAR PROJECTION

[75] Inventors: Daniel J. Dargis; Larry S. Brown; Jeffrey L. Sharp, all of Knoxville, Tenn.

[73] Assignee: North American Philips Corporation, New York, N.Y.

[21] Appl. No.: 968,625

[22] Filed: Oct. 29, 1992

[51] Int. Cl.⁵ ............................................... H04N 5/74
[52] U.S. Cl. ...................................... 358/766; 353/71; 353/74; 348/789; 348/794
[58] Field of Search ................. 353/71, 72, 119, 74; 358/231, 236, 60, 254, 188

[56] References Cited

U.S. PATENT DOCUMENTS

| | | | |
|---|---|---|---|
| 3,807,847 | 4/1974 | Okano | 353/71 |
| 3,885,868 | 5/1975 | Hadzimihalis | 353/71 |
| 3,951,518 | 4/1976 | Kobayashi et al. | 358/231 X |
| 4,163,610 | 8/1979 | Sanderson | 358/231 X |
| 4,273,396 | 6/1981 | Teragaki et al. | 353/71 X |
| 4,572,632 | 2/1986 | Bodier et al. | 353/71 |
| 5,090,800 | 2/1992 | Ushiro | 353/71 |
| 5,173,781 | 12/1992 | Masreliez | 358/254 X |

*Primary Examiner*—Mark R. Powell
*Attorney, Agent, or Firm*—David R. Treacy

[57] ABSTRACT

A projection television system which adapts automatically between from screen projection and rear screen projection upon insertion of the projector into a rear screen cabinet. A compact projection unit has a quick-disconnect electric connector and optical aligner which mate with connection elements in a projection cabinet upon insertion of the projector into an opening in the front of the cabinet. The cabinet has a two-mirror optical relay which inverts the projected picture. Upon completion of insertion, the electric connections automatically invert the image being projected by the projector. In another embodiment, insertion also automatically connects to audio equipment in the rear screen cabinet.

15 Claims, 4 Drawing Sheets

DOCKABLE LCD TV PROJECTOR CONVERTABLE BETWEEN FRONT AND REAR PROJECTION

BACKGROUND OF THE INVENTION

1. Field of the Invention

The invention relates to the field of projection television; and more particularly to the use of small portable TV projectors having a liquid crystal light valve to modulate light from a fixed light source. Such projectors are often referred to as LCD projectors, to distinguish them from earlier types having one or more high brightness cathode ray tubes. LCD projectors offer convenience to the user because the projector may be little larger than a 35 mm photographic slide projector, and is therefore portable.

2. Description of the Prior Art

LCD TV projectors are now commercially available, but as a practical matter are limited either to portable use for front projection against a screen or wall, or non-portable use when installed in a rear screen projection TV arrangement.

Particularly in a private home, front projection has the advantage that the picture size can be adjusted to the audience requirements, by using a zoom projection lens or moving the projector closer to or farther from a wall or screen. However, this technique requires that the general room lighting level be undesirably low, so that sufficient picture contrast can be obtained. Further, if reasonable audio fidelity is desired, the projector must use an external loudspeaker system. To cause the sound to seem to come from the vicinity of the picture, the loudspeakers must be placed or moved to a position which may be undesired for other room activity.

Because of the disadvantages of front projection described above, most home TV projection systems use rear projection. This enables easy integration of the TV sound system with the cabinet or wall in which the screen is placed, and provides maximum screen brightness and picture contrast for a given size and power of the light source/valve assembly. However, this system lacks the flexibility of providing a much larger image, even if not so bright, when viewing by a relatively large group is desired.

SUMMARY OF THE INVENTION

In accordance with the invention, a projection television system includes a cabinet assembly having a rear projection screen, a mounting assembly for receiving a dockable TV projection unit, an optical relay system for coupling a docked projector's optical output to the screen, and an electrical quick-disconnect assembly for interfacing between the projector and the cabinet assembly; and a dockable TV projection unit which can project a television picture on a reflecting surface when not docked in the cabinet assembly, and includes a mating electrical quick-disconnect assembly, and provision for alignment to the optical relay system.

In a preferred embodiment, the cabinet assembly has a front face with an aperture for insertion of the projector by sliding straight in, during the last portion of inward movement the mating optical alignment devices and quick-disconnect assemblies engaging to enable immediate use of the projector. A projector which is particularly advantageous for this embodiment has all the operator controls arranged on the end of the projector remote from the objective lens, so that all control functions can be performed by manipulating knobs or switches which project slightly into the room. Alternatively, the receptor for a remote control device is arranged on that end of the projector and exposed through the cabinet aperture, so that it can receive control signals from a device such as those using infrared transmission.

In order to make the rear projection cabinet as compact as possible, the optical relay arrangement preferably uses a first mirror toward the lower rear of the cabinet, and a large second minor toward the upper rear. Because the light rays undergo two reflections in a vertical plane, there is an up-down reversal of the image on the screen; that is, the rays radiating downward from the projector objective lens reflect from the front lower edge of the first mirror to the upper front edge of the second mirror to the upper edge of the screen. Thus the image is upside down compared to conventional projection against a screen or wall. To accommodate this reversal, the vertical scan circuitry of the light valve uses addressable scanning, so that vertical scan is easily reversed without affecting the right-left scan. A control signal for the scan circuitry is provided through the electrical quick-disconnect assembly, for example by providing a shorting connection between two circuit points which are brought out to the electrical connector on the projector.

According to another aspect of the invention, the projector optical system may be arranged such that the central ray from the center of the image is slightly inclined from the image plane within the projector, preferably in an upward direction to and through the projector lens. This allows projecting against a wall or front projection screen somewhat above the projector without a "keystone" effect, and may provide improved LCD valve function. To minimize optical distortion, it is usually preferable that the lens axis be perpendicular to the image plane. For use with such a "reduced keystone" projector, the cabinet assembly of a rear screen projection system is arranged such that the central ray impinging on the screen does so at a matching downward angle as it is reflected off the second (upper) mirror. This arrangement can also enable the cabinet to be slightly shallower, for a given screen size and objective lens focal length.

DESCRIPTION OF THE PREFERRED EMBODIMENTS

Figure 1:
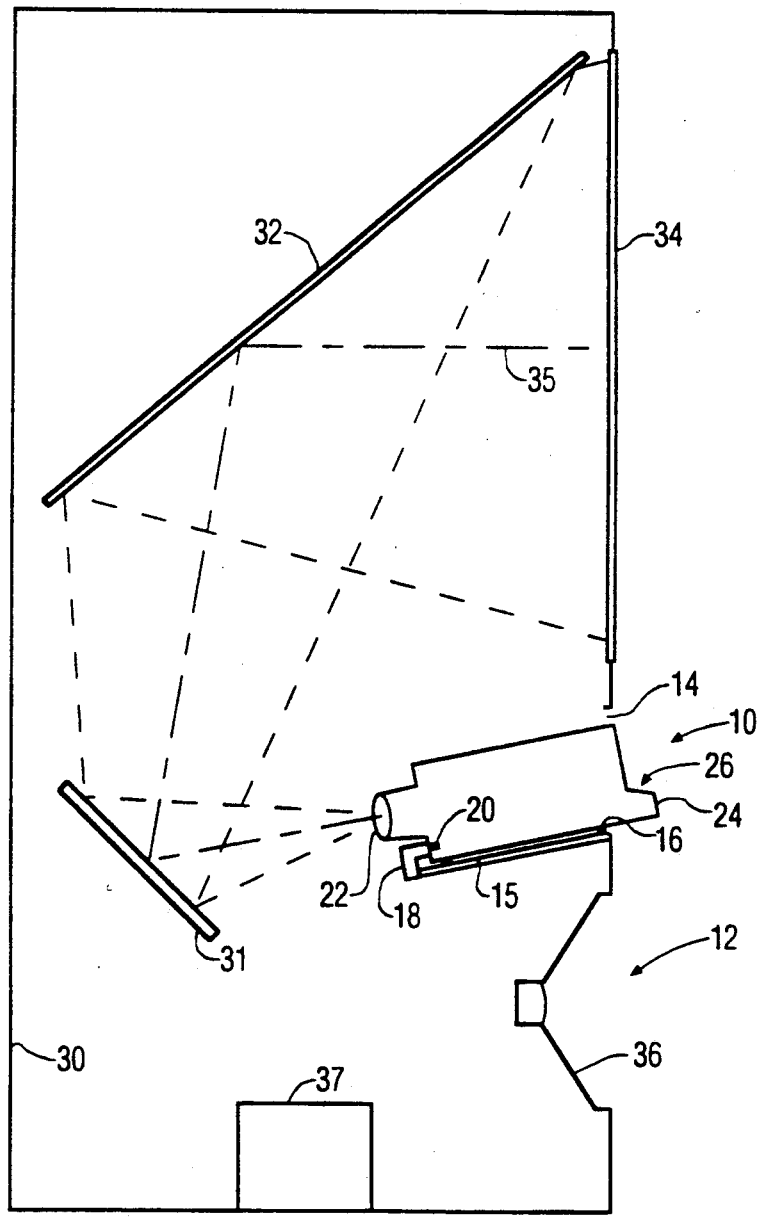
FIG. 1 is a diagrammatic view of a projection TV system according to the invention, showing the dockable LCD projector inserted for rear-projection viewing.

As shown in FIG. 1, an LCD projection TV system according to the invention includes a dockable projector 10 which can be manually inserted into a cabinet 12 for rear projection viewing. The cabinet 12 has a front aperture 14 opening to projector-receiving space having an inclined bottom 15 on which the conventional feet 16 of the projector rest while the projector is being inserted. Optionally, the bottom has grooves (not shown) which guide the lens end of the projector into alignment with a combined mechanical alignment and electrical connection element 18 which, together with a mating alignment element and connector 20 on the projector form a quick-disconnect assembly. Upon completion of insertion, the lens 22 and the rest of the projector are held in accurate alignment with the cabinet optics to be described below. In this embodiment the rear end 24 of the projector projects slightly from the front face of the cabinet, so that controls indicated generally by the arrow 26 can be manipulated by a user. At the same time, the power cord for the projector (not shown) may hang downward outside the cabinet; or power can be provided through the quick-disconnect assembly. In addition to the usual audio and video controls, there may be a knob or switch for controlling focus of the projector through slight movement of the lens 22. Alternatively, a signal via the connection element 18 may cause the projector to move to a present focus position.

The cabinet 12 has a rigid frame 30 to which are mounted a first mirror 31 at the lower rear, which reflects light coming from the projector 10 upward, and a second mirror 32 which then reflects the light beam forward to the rear of a rear projection screen 34 which may be of any well-known type or design. In this embodiment the central ray 35 of the light from the projector strikes the center of the screen from a direction perpendicular to the screen. To provide a common direction for sight and sound, a stereo speaker system is built into the cabinet 12, including loudspeakers 36 and power amplifying equipment 37. The audio signals for them are supplied from the projector 10 through the quick disconnect assembly's connectors 18 and 20.

Figure 2:
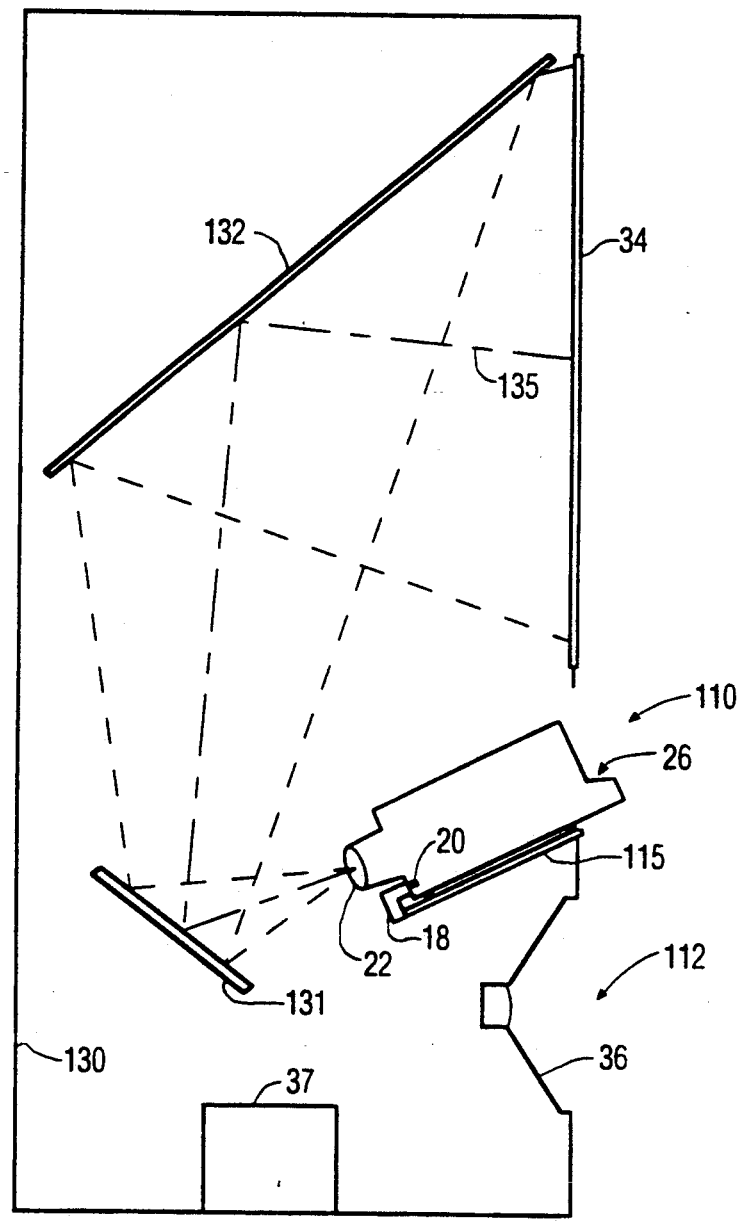
FIG. 2 is a diagrammatic view of an embodiment whose optical layout allows use of a shallower cabinet.

The projection system shown in FIG. 2 differs from that of FIG. 1 by needing less cabinet depth, and incorporating a projector having reduced key-stoning. Parts which are unchanged from the FIG. 1 embodiment have the same reference numeral, while those which are different have a numeral 100 higher. The projector 100 is essentially the same as that shown in FIG. 1, except that the lens 22 is mounted slightly higher than the centerline of the light valve or image-producing device within the projector. Preferably the light valve has a perfectly rectangular grid or raster arrangement which is perpendicular to the plane defined by the feet of the projector. The lens 22 is mounted to project the central rays of the image at an angle slightly upward, such as 3° to 10°; the embodiment shown is 5°. With this arrangement, when the projector is placed on a level surface for projection against a vertical wall or screen, a rectangular image (no keystone effect) will be produced 5° above the objective lens 22 centerline.

The cabinet 112 is slightly shallower than the cabinet 12, although the image distance from lens 22 to screen 34 is unchanged. This advantage is gained because the first mirror 131 is placed in a slightly different position and angle, and the bottom 115 is at a different angle, causing the central ray 135 to be directed 5° downward as it travels from the second mirror 132 to the screen 34. Although the mirror 132 is at the same angle as mirror 32, it does not extend quite as far to the rear, allowing the front-to-rear dimension of the frame 130 to be reduced. In this embodiment the controls 26 remain fully accessible to a user, and there is no obstruction of the optical path from a hand-held remote controller to the rear of the projector 110.

Figure 3:
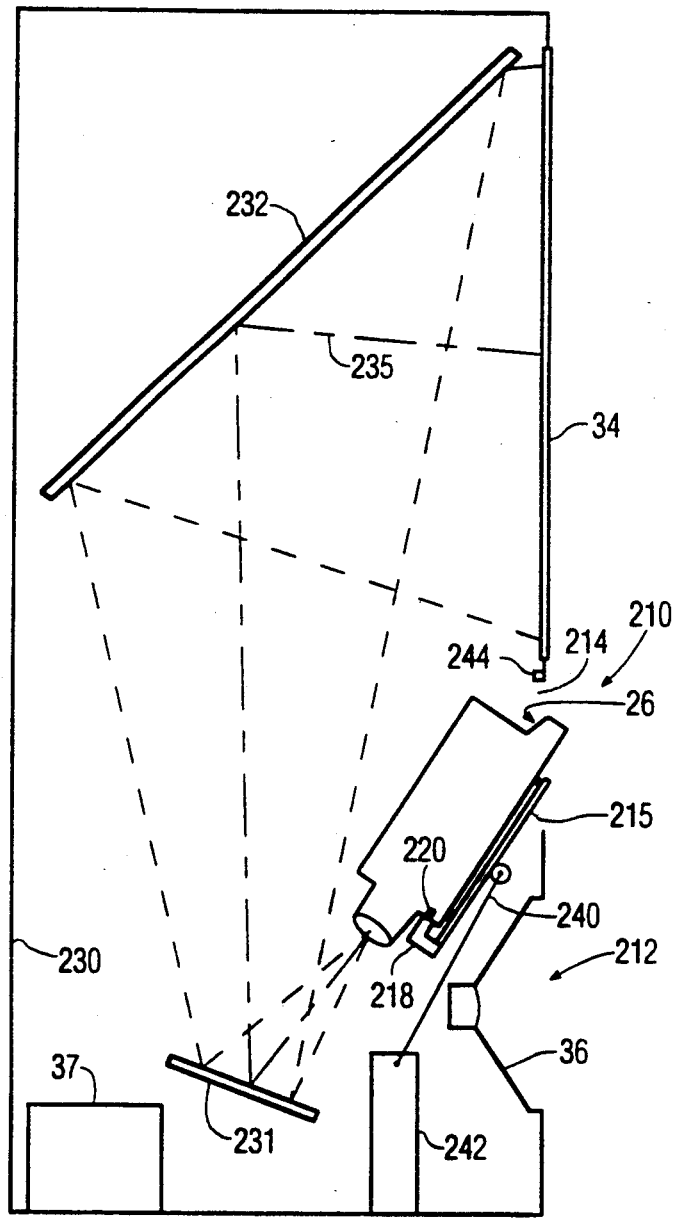
FIG. 3 is a diagrammatic view of a third embodiment of the invention having a movable support for receiving the projector.

FIG. 3 shows a third embodiment having a still shallower cabinet, yet having a longer focal length lens 222 in the projector 210. The projector 210 has the same 5° rise in its central projected ray, but the second mirror 232 is tilted slightly more from the horizontal and the first mirror 231 is located differently. These changes allow the front-to-rear distance of the frame 230 to be still smaller, but require tilting the bottom 215, which supports the projector 210, at such an angle from the horizontal that the projector cannot be simply slid straight into the operating position. As can be seen in FIG. 3, the opening 214 in the front face of the cabinet 212 is slightly larger than the opening 14 of the cabinet 12, but the projector would still interfere with the lower part of the screen 34 if the bottom 215 were fixed in position. To permit this most compact construction, the bottom 215 is movable by linkage 240 which is schematically shown and is operated by a mechanism 242. In the loading position, the bottom will be aligned generally as shown in FIG. 1 or FIG. 2, while in the operating position the bottom 215 and projector 210 have been moved inwards and pivoted to a more vertical position.

In this embodiment the normal controls 26 are inaccessible, so that the projector is operated by a remote control. If desired, an additional control receptor 244 is mounted on the front face of the cabinet 212, and control signals are relayed to the projector through the connectors 218 and 220.

Figure 4:
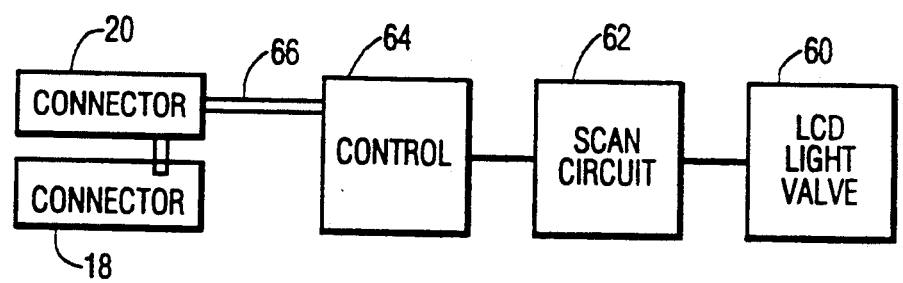
FIG. 4 is a block diagram of the projector control and cabinet interconnections.

The optical ray tracings of FIGS. 1-3 show that rays emanating downward from the lens 22 are directed to the top of the screen. This requires that the light valve or image device in the projector reverse its vertical direction of scan when compared with front screen projection. This is automatically achieved, upon inserting the projector into the cabinet, when the connector 20 (or 220) mates with the connector 18 (or 218). As shown schematically in FIG. 4, the light valve 60 is driven by a scan circuit 62 which, among other parameters, selects the horizontal row which receives signal up-dating. Circuit 62 is controlled by a circuit 64 which provides normal (front screen, no intervening mirrors) scan when there is no external connection between a conductor pair 66. The conductor pair 66 is connected to the connector 20, and the conductors 66 are shorted together by a strap in connector 18 when the connectors 18 and 20 mate during insertion into the cabinet.

ALTERNATIVE EMBODIMENTS

Those of ordinary skill in the art will recognize that may alternative embodiments can utilize the invention as claimed below. For example, the rear projection screen can be mounted directly in a wall, the front face being the wall surface. Electrical power for the projector can be supplied through the quick-disconnect arrangement when inserted into the rear screen unit, and can be supplied via a cord plugged into the same quick-disconnect jack on the projector for independent use, projecting against a wall or screen. Audio or other effects can be controlled or provided independently of the rear projection screen cabinet. A different optical layout, such as a single internal mirror, or three total mirrors, can be used in the cabinet so that scan reversal is not required. Accordingly the scope of the invention is to be measured by the claims appended, or added subsequently.

We claim:
1. A projection television system, comprising:

a frame having a front face; a television image projector, for projecting a bundle of rays of light to form a television picture; means for mounting said projector in said frame; a rear projection screen mounted in said front face, having a rear surface for receiving said bundle of rays to form a television picture viewable from in front of said screen; and an optical relay system for optically coupling said projector to said screen, characterized in that:

said projection television system comprises at least one electric element mounted to said frame; and quick-disconnect means including a first connector device for electrically connecting between said at least one electric element and said projector, said projector comprises at least one projector optical alignment element, a second connector device forming part of said quick-disconnect means, and said means for mounting comprises means permitting manual insertion of said projector through said front face, and means cooperating with said at least one projector optical alignment element for removably holding said projector, when manually inserted through said front face, in an operating position in optical alignment with said optical relay system.

2. A system as claimed in claim 1, characterized in that said at least one electric element comprises at least one loudspeaker.

3. A system as claimed in claim 2, characterized in that said quick-disconnect means establishes electric connection to said at least one electric element during insertion of said projector to said operating position.

4. A system as claimed in claim 3, characterized in that said projector is arranged for projection of a television picture directly onto a reflecting surface for direct viewing of the reflected picture, when not inserted through said front face.

5. A system as claimed in claim 1, characterized in that said optical relay system inverts said bundle of rays, and said at least one electric element includes means for causing electric inversion of the picture being projected by the projector.

6. A system as claimed in claim 5, characterized in that said quick-disconnect means establishes electric connection to said at least one electric element during insertion of said projector to said operating position.

7. A system as claimed in claim 1, characterized in that said quick-disconnect means establishes electric connection to said at least one electric element during insertion of said projector to said operating position.

8. A system as claimed in claim 1, characterized in that said projector is arranged for projection of a television picture directly onto a reflecting surface for direct viewing of the reflected picture, when not inserted through said front face.

9. A projection television system, comprising:

a frame having a front face; a television image projector, for projecting a bundle of rays of light to form a television picture; means for mounting said projector in said frame; a rear projection screen mounted in said front face, having a rear surface for receiving said bundle of rays to form a television picture viewable from in front of said screen; and an optical relay system for optically coupling said projector to said screen, characterized in that:

said optical relay system comprises two mirrors, one disposed toward a lower rear portion of the frame, and one disposed toward an upper rear portion of the frame, for reflecting said bundle of rays to said rear surface with vertical inversion of said picture free from mirror-image inversion, said projection television system comprises at least one electric element mounted to said frame; and quick-disconnect means including a first connector device for electrically connecting between said at least one electric element and said projector, said projector comprises at least one projector optical alignment element, a second connector device forming part of said quick-disconnect means, and means cooperating with said at least one electric element for causing electric inversion of the picture being projected by the projector, and said means for mounting comprises means permitting manual insertion of said projector through said front face, and means cooperating with said at least one projector optical alignment element for removably holding said projector, when manually inserted through said front face, in an operating position in optical alignment with said optical relay system.

10. A system as claimed in claim 9, characterized in that said first and second connector devices are connected by insertion of said projector to said operating position.

11. A system as claimed in claim 9, characterized in that said means for mounting comprises a receiving element on which said projector is placed during manual insertion, and means for moving said receiving element together with said projector to said operating position after said quick-disconnect means has established said electric connection.

12. A system as claimed in claim 11, characterized in that said cabinet further comprises at least one loudspeaker, and means for providing audio signals from said projector to said loudspeaker after said quick-disconnect means has established said electric connection.

13. A system as claimed in claim 9, characterized in that said front face has an aperture for receiving said projector by sliding straight in, and during a final portion of inward movement said means for removably holding engages said projector optical alignment element.

14. A system as claimed in claim 13, characterized in that said cabinet further comprises at least one loudspeaker, and means for providing audio signals from said projector to said loudspeaker after said quick-disconnect means has established said electric connection.

15. A television image projector for selective front or rear screen projection, comprising means for projecting a bundle of rays of light to form a television picture, quick-disconnect means for electrically connecting to at least one electric element in a rear screen projection unit and means for causing electric inversion of the projected picture upon electric connection to said electric element.

* * * * *